US012358124B2

(12) United States Patent
Spainhower

(10) Patent No.: US 12,358,124 B2
(45) Date of Patent: Jul. 15, 2025

(54) ADJUSTABLE CREEPER

(71) Applicant: PALS Manufacturing LLC, West Valley City, UT (US)

(72) Inventor: Paul Spainhower, West Valley City, UT (US)

(73) Assignee: PALS Manufacturing LLC, West Valley City, UT (US)

( * ) Notice: Subject to any disclaimer, the term of this patent is extended or adjusted under 35 U.S.C. 154(b) by 11 days.

(21) Appl. No.: 18/056,020

(22) Filed: Nov. 16, 2022

(65) Prior Publication Data

US 2023/0173656 A1 Jun. 8, 2023

Related U.S. Application Data

(60) Provisional application No. 63/287,407, filed on Dec. 8, 2021.

(51) Int. Cl.
*B25H 5/00* (2006.01)

(52) U.S. Cl.
CPC .................................... *B25H 5/00* (2013.01)

(58) Field of Classification Search
CPC ... B25H 5/00; B62B 2202/48; B62B 2202/42; B62B 2205/003; B62B 2205/20
See application file for complete search history.

(56) References Cited

U.S. PATENT DOCUMENTS 2,780,472 A * 2/1957 Weldon, Sr. ............ B25H 5/00 280/32.6
2,843,391 A * 7/1958 Pelletier .................. B25H 5/00 280/30
4,895,380 A * 1/1990 Brooks .................... B25H 5/00 280/32.6
5,108,118 A * 4/1992 Schaevitz ................ B25H 5/00 280/32.6
5,261,725 A * 11/1993 Rudolph .................. A47C 9/02 297/DIG. 10
5,537,700 A * 7/1996 Way ..................... A61G 1/0212 296/20
5,547,245 A * 8/1996 Knouse ................ A61G 5/1094 297/411.36
5,584,082 A * 12/1996 Crawford .............. A61G 5/006 5/616
RE37,372 E * 9/2001 Smith ...................... B25H 5/00 280/32.6

(Continued)

*Primary Examiner* — James M Dolak
(74) *Attorney, Agent, or Firm* — TechLaw Ventures, PLLC; Terrence J. Edwards

(57) ABSTRACT

Systems and devices for use in working on aircraft, automobiles or other machines are disclosed. A creeper for use in working on aircraft, automobiles or other machines may include a bottom frame; a top frame; a plurality of rolling members disposed on the bottom frame; and a seat and backrest disposed on the top frame. The top frame is configured to be height adjustable, and the angle of the backrest is independently adjustable relative to the seat. A system for an adjustable seat, an adjustable backrest, and a rolling means for a mechanical creeper is also disclosed. The system includes a mechanic's creeper that comprises a bottom frame; a plurality of rolling members disposed on the bottom frame; a top frame; a seat disposed on the top frame; a backrest disposed on the top frame; and an adjustment mechanism disposed between the bottom frame and the top frame.

18 Claims, 8 Drawing Sheets

(56) References Cited

U.S. PATENT DOCUMENTS

| | | | | |
|---|---|---|---|---|
| 6,425,590 | B1 * | 7/2002 | Whiteside | B25H 5/00 280/32.6 |
| 6,578,857 | B1 * | 6/2003 | Whiteside | B25H 5/00 280/32.6 |
| 6,908,154 | B2 * | 6/2005 | Aono | A61G 7/1059 297/354.13 |
| 7,025,421 | B1 * | 4/2006 | Fowler | A47C 3/36 297/325 |
| 7,032,909 | B2 * | 4/2006 | Lensing | B25H 5/00 280/32.6 |
| 7,434,817 | B2 * | 10/2008 | Rush | B25H 5/00 280/32.6 |
| 7,581,265 | B1 * | 9/2009 | Bourgraf | A61G 1/0212 5/618 |
| 7,703,726 | B2 * | 4/2010 | Harrison | A47D 1/0085 248/163.1 |
| 9,193,064 | B2 * | 11/2015 | Dall'Armi | B25H 5/00 |
| 9,610,682 | B2 * | 4/2017 | Shaner | B25H 5/00 |
| 10,549,418 | B1 * | 2/2020 | Cook | B25H 5/00 |
| 10,661,431 | B1 * | 5/2020 | Hightower | B25H 5/00 |
| 11,969,875 | B1 * | 4/2024 | Gess | F21V 33/00 |
| 12,109,679 | B2 * | 10/2024 | Obitts | B25H 5/00 |
| 2004/0227313 | A1 * | 11/2004 | Shockley | B25H 5/00 280/32.6 |
| 2012/0235371 | A1 * | 9/2012 | Smith | B25H 5/00 280/32.6 |
| 2018/0222037 | A1 * | 8/2018 | Hendrickson | A47C 9/027 |

* cited by examiner

ADJUSTABLE CREEPER

TECHNICAL FIELD

The disclosure relates generally to equipment and tools for use by mechanics, technicians, and others in the maintenance of aircraft, automobiles, or other machines having little ground clearance. In particular, this disclosure relates to low, wheeled creepers to facilitate access beneath aircraft, automobiles, or other machines.

BACKGROUND

Creeper devices are widely used in repair shops and factories to allow a mechanic or technician to work underneath aircraft, automobiles, or other machines having little ground clearance. Creepers generally comprise rolling horizontal platforms close to the ground that workers rest upon to work on equipment overhead. Creepers typically have a plurality of wheels that allow worker to move in a horizontal position to different locations under an aircraft, automobile, or machine by rolling the creeper in order to work on equipment overhead. However, during the repair process, the worker may need to reach higher than arm length alone would allow. In these cases, the worker may prop themselves up or, if there is enough room, attempt to sit or stand up. This, however, is not convenient, and may be tiresome, especially if the worker is required to maintain that position of an extended period.

There are several creepers that convert between two positions. For example, the following United States patents and applications describe creepers that convert from flat to chair-like and are expressly incorporated herein by reference: RE35,732, U.S. Pat. Nos. 5,707,067, 6,199,877, 6,425,590, 6,834,868, 6,969,077, 7,481,438, 9,193,064, and US 2018/0222037.

These creepers can be helpful, but they are not designed to be used in intermediate positions. Rather they are designed to be used as a creeper, or as a chair. In addition, many of these creepers require substantial time and/or effort to convert from creeper to chair. For example, U.S. Pat. No. 9,193,064 to Dall'Armi et al., discloses a creeper that converts to a chair via hydraulic actuation and requires a worker to use a hand pump to manually provide hydraulic pressure.

US 2018/0222037 to Hendrickson may be used as a creeper or a chair and has several intermediate positions between creeper and chair. However, it is not possible to adjust the height of Hendrickson's creeper for a user in the horizontal position. Furthermore, Hendrickson's creeper does not allow for independent adjustment of the backrest with respect to the seat.

In light of the foregoing, disclosed herein are systems, and devices for an improved creeper that allows the worker to adjust the height of the creeper for elevated work in the horizontal position and also allows the worker to independently adjust the backrest.

BRIEF DESCRIPTION OF THE DRAWINGS

Non-limiting and non-exhaustive implementations of the disclosure are described with reference to the following figures, wherein like reference numerals refer to like or similar parts throughout the various views unless otherwise specified. Advantages of the disclosure will become better understood with regard to the following description and accompanying drawings where.

DETAILED DESCRIPTION

Disclosed herein are systems and devices for use in working on aircraft, automobiles, or other machines. Before the systems and devices for use in working on aircraft, automobiles or other machines are disclosed and described, it is to be understood that this disclosure is not limited to the configurations, process steps, and materials disclosed herein as such configurations, process steps, and materials may vary somewhat. It is also to be understood that the terminology employed herein, is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the term "about" used in reference to a given parameter is inclusive of the stated value and has the meaning dictated by the context (e.g., it includes the degree of error associated with measurement of the given parameter).

As used herein, the terms "comprising," "including," "containing," "characterized by," and grammatical equivalents thereof are inclusive or open-ended terms that do not exclude additional, unrecited elements or method steps.

A detailed description of systems, methods, and devices consistent with embodiments of the disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for clarity, certain technical material that is known in the related art has not been described in detail to avoid unnecessarily obscuring the disclosure.

Figure 1:
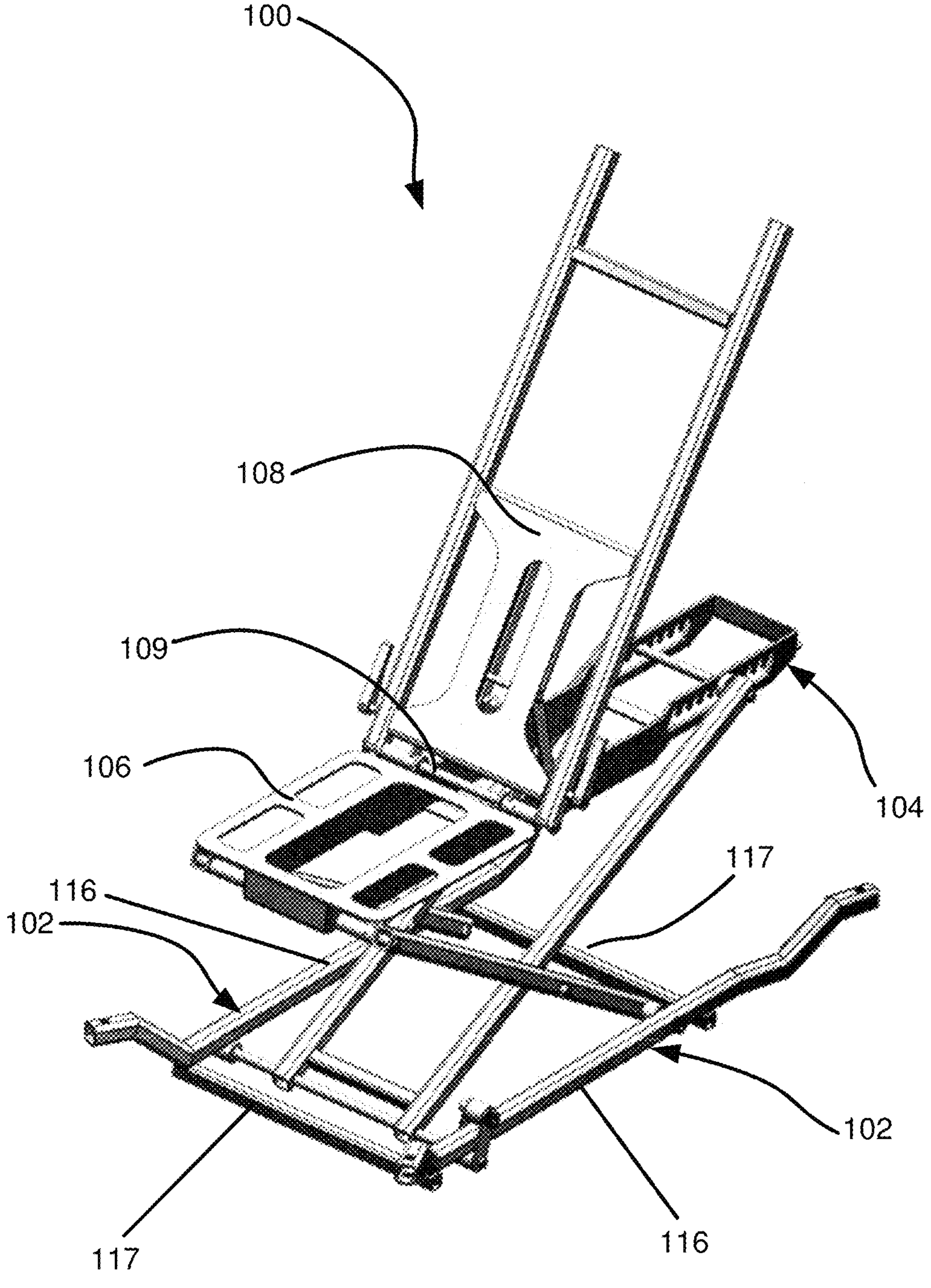
FIG. 1 is a top perspective view of an exemplary implementation of an adjustable creeper configured in a chair position.

Referring now to the figures, FIG. 1 is a top perspective view of an exemplary implementation of a mechanic's creeper 100. Mechanic's creeper 100 includes a bottom frame 102 and a top frame 104. In the exemplary implementation of FIG. 1, a seat 106 and a backrest 108 may be part of or attached to the top frame 104. The top frame is illustrated in FIG. 1 as being in an elevated position with respect to the bottom frame 102 with the seat 106 and the backrest 108 in a raised position also with respect to the bottom frame 102, such that the mechanic's creeper 100 is configured to function as a chair or may be adjusted to lie flat and used as a creeper device.

The bottom frame 102 may comprise a plurality of frame rails 116 and a plurality of frame cross members 117. As illustrated, the bottom frame 102 may comprise a first frame rail 116 and a second frame rail 116 and may further comprise one or more bottom frame cross members 117.

The top frame 104 may comprise at least the seat 106, the backrest 108, and a hinge 109. The hinge 109 may be located between the seat 106 and the backrest 108. The seat 106 and the backrest 108 may be connected at the hinge 109 and the backrest 108 is able to rotate about the hinge 109 and with respect to the seat 106. Rotating (or raising) the backrest 108 transforms the creeper 100 and configures it to function as a chair. The top frame 104 is shown without padding or any covering to better illustrate the various components and features of the top frame 104 and the creeper 100. It will be appreciated that the creeper 100 may include padding on the seat 106 and the backrest 108 for added comfort for the user.

Figure 2:
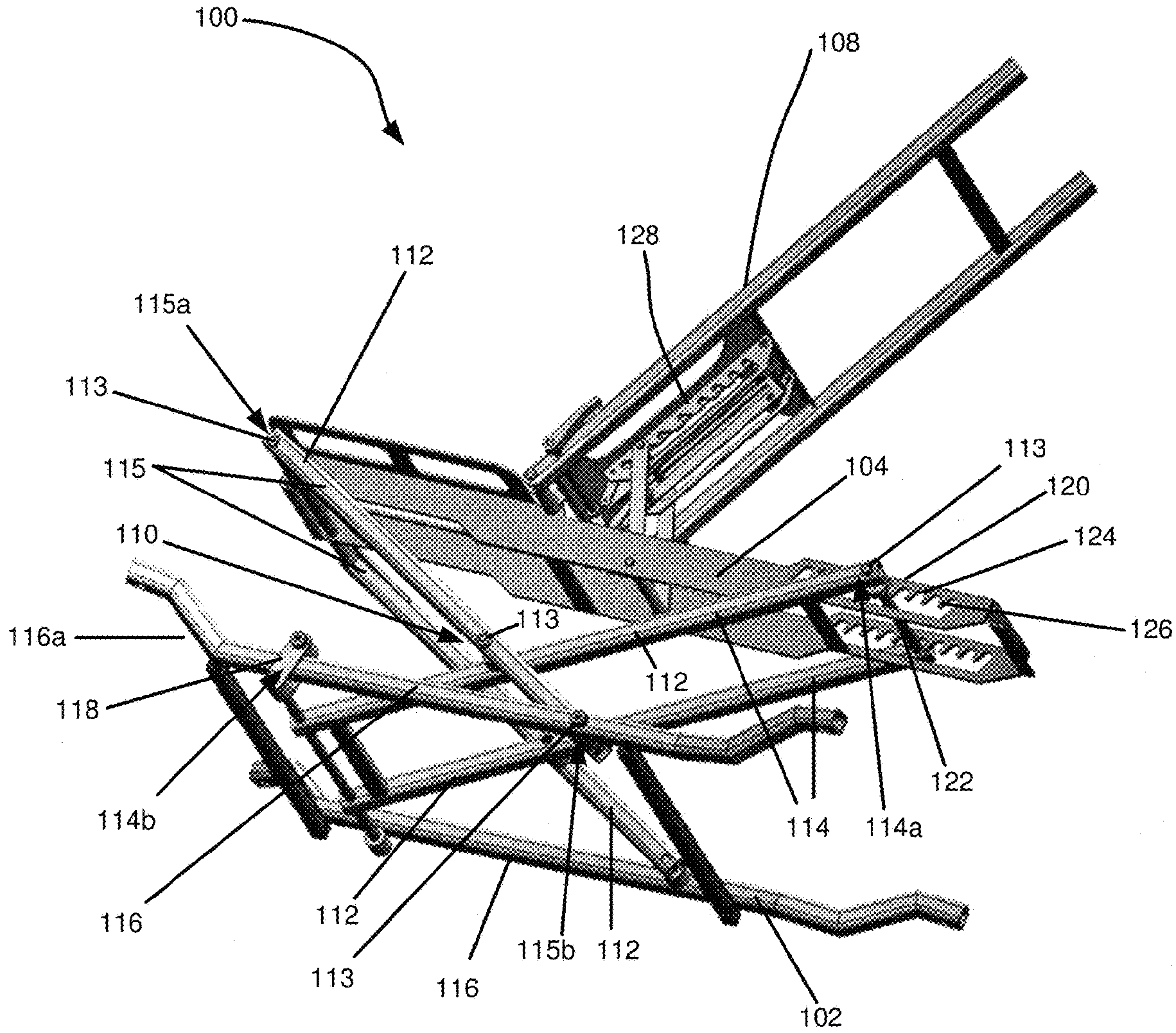
FIG. 2 is a bottom perspective view of an exemplary implementation of the adjustable creeper configured in the chair position.

FIG. 2 is a bottom perspective view of an exemplary implementation of the mechanic's creeper 100. In the exemplary implementation of FIG. 2, the top frame 104 and the bottom frame 102 may be connected with an adjustment mechanism 110 that may be formed using a plurality of supports 112 in crisscrossed or scissor manner. In the exemplary implementation shown in FIG. 2, there are four supports 112 paired together to form a pair of crisscrossed supports comprising the adjustment mechanism 110. The adjustment mechanism 110 raises the top frame 104 vertically by way of the two pairs of linked crisscross supports 112.

A first end 115*a* of a first set 115 of the crisscross supports 112 may be attached to the top frame 104 with one or more pins 113 or another attachment mechanism, while a second end 115*b* of the first set 115 of crisscross supports 112 of the adjustment mechanism 110 may be attached to the bottom frame rails 116 of the bottom frame 102 with one or more pins 113 or another attachment mechanism.

A first end 114*a* of a second set 114 of crisscross supports 112 of the adjustment mechanism 110 may be attached to the top frame 104 with one or more pins 113 or another attachment mechanism, while a second end 114*b* of the second set 114 of the crisscross supports 112 may be attached to the bottom frame rails 116 of the bottom frame 102 via one or more slider mechanisms 118. The one or more slider mechanisms 118 allow the adjustment mechanism 110 to function by allowing the second set 114 of crisscross supports 112 to move or slide to various positions with respect to the top frame 104 and the bottom frame 102. In particular, when the mechanic's creeper 100 is collapsed, the slider mechanisms 118 will be positioned at a distal end 116*a* along each of bottom frame rails 116. As the top frame 104 is raised, the one or more slider mechanisms 118 slide along the bottom frame rail 116 away from the distal end 116*a* of the bottom frame rails 116 towards the center of the bottom frame rails 116.

In the exemplary implementation of FIG. 2, the top frame 104 of the mechanic's creeper 100 may comprise a first ratcheting locking device 120. The first ratcheting locking device 120 may be disposed within the top frame 104 or may be otherwise connected to the top frame 104.

Figure 3:
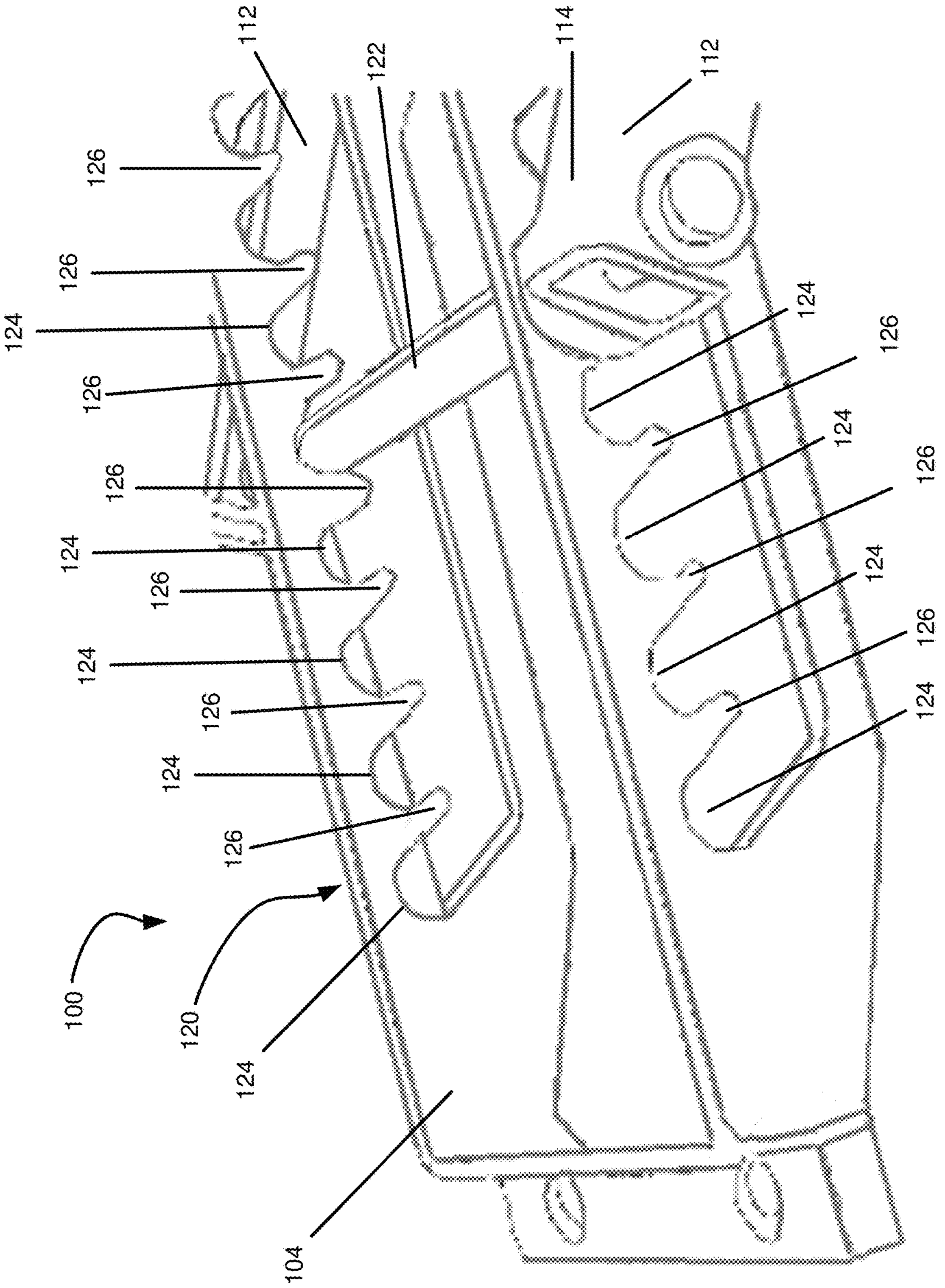
FIG. 3 is an enlarged view of an exemplary implementation of a first latching device for the scissor lift.

FIG. 3 illustrates an enlarged view of the first ratcheting locking device 120 of the top frame 104. In this exemplary implementation, the first ratcheting locking device 120 includes a plurality of ratchet teeth 126, for example nine ratchet teeth 126, that may be formed between a plurality of grooves 124, for example ten grooves 124, thereby forming a plurality of different ratchet positions, for example ten different ratchet positions. It will be appreciated that any number of different ratchet positions may be utilized by the disclosure, but more ratchet positions provides additional adjustability. The first ends 114*a* of the second set 114 of crisscross supports 112 may be attached to a connecting bar 122 that is configured to rest in one of the plurality of grooves 124 of the first ratcheting locking device 120 to lock the top frame 104 in place.

The top frame 104 may be raised from a flat position by grasping the top frame 104 and pulling it upward or in a manner such that the connecting bar 122 may be removed from a corresponding set of grooves 124. As the top frame 104 moves upward, the connecting bar 122 slides out of the groove 124 and over the ratchet teeth 126 thereby permitting the connecting bar 122 to freely move to another position within the first ratcheting locking device 120 until the desired location and height is reached. At that point, the top frame 104 is released and the connecting bar 122 slides into one of the sets of grooves 124 of the first ratcheting locking device 120 and is locked in place by the ratchet teeth 126 of first ratcheting locking device 120. To lower the top frame 104 from a raised or seated position to another position, the connecting bar 122 may be raised and removed from the groove 124 that locks it into place, and the top frame 104 is lowered to a new location and desired height, or fully collapsed such that the top frame 104 is adjacent to the bottom frame 102 and the mechanic's creeper 100 is once again flat.

Figure 4:
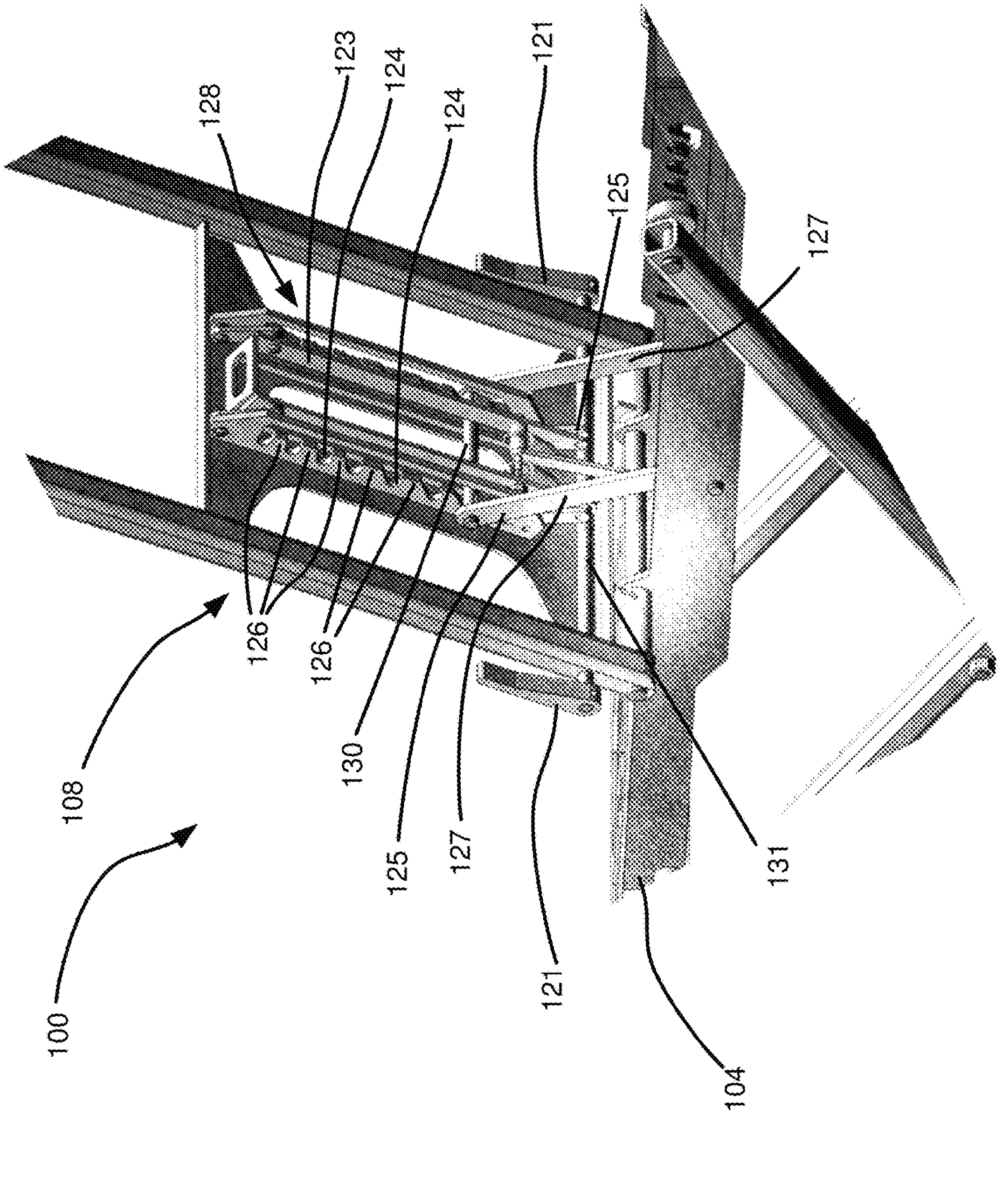
FIG. 4 is an enlarged view of an exemplary implementation of a second latching device for the backrest.

FIG. 4 shows a perspective enlarged view of a backside or underside of the backrest 108 device. In an exemplary implementation, the backrest 108 device also includes a second ratcheting locking device 128 configured to lock the backrest 108 into a chosen position and angle of the backrest 108. The second ratcheting locking device 128 includes a plurality of ratchet teeth 126, for example, seven ratchet teeth 126, that may be formed between a plurality of grooves 124, for example eight grooves 124, thereby forming a plurality of different ratchet positions, for example eight different ratchet positions. It will be appreciated that any number of different ratchet positions may be utilized by the disclosure, but more ratchet positions provides additional adjustability. The backrest 108 and the second ratcheting locking device 128 may comprise one or more levers 121 attached to a spring guided frame 123 and a linkage 125 with a first connecting bar 130 running through a part of the linkage 125. The linkage 125 may comprise a second connecting bar 131 that connects to the levers 121, such that rotational movement of the levers 121 results in rotational movement of the second connecting bar 131. The linkage 125 may also include two supports 127 that are connected by the first connecting bar 130. The two supports 127 may be attached and secured to the top frame 104. The two supports 127 may also be connected to the spring guided frame 123. Through the linkage 125, the backrest 108 may be adjusted by actuating, manipulating, or rotating at least one or more levers 121, such that the spring guided frame 123 and the linkage 125 pushes the connecting bar 130 forward and out of the grooves 124 of the second ratcheting locking device 128 to a desired position, height, and/or angle. As the one or more levers are actuated, manipulated, or rotated the connecting bar 130 slides upward and over the ratchet teeth 126 and the grooves 124 until the desired height/angle is reached thereby adjusting the backrest 108. At that point, the connecting bar 130 slides into one of the grooves 124 of the second ratcheting locking device 128 and is locked in place by the ratchet teeth 126 of the second ratcheting locking device 128. It will be appreciated that the backrest 108 may be raised or lowered to any desired height or position, including a fully collapsed position wherein the backrest 108 is adjacent to the top frame 104 and the mechanic's creeper 100 is able to lie flat.

In the exemplary implementation, the first ratcheting locking device 120 has a plurality of locking positions, ten locking positions as illustrated best in FIG. 2, and the second ratcheting locking device 128 has a plurality of locking positions, eight locking positions as illustrated best in FIG. 2. This allows this exemplary implementation of the creeper 100 to be configured in eighty different positions, which is significantly more positions and configurations than prior art configurations due to the duality of the first ratcheting locking device 120 and the second ratcheting locking device 128. Furthermore, the two ratcheting locking devices allow the backrest 108 of the mechanic's creeper 100 to be positioned independently from the height of the top frame 104 of the mechanics creeper 100. This is also a significant improvement over the prior art and provides substantially improved comfort and flexibility for workers working on aircraft, automobiles, or other equipment. Thus, it should be appreciated that the mechanic's creeper 100 allows for great flexibility in working in, around, and under various type of machines and/or equipment.

Figure 5:
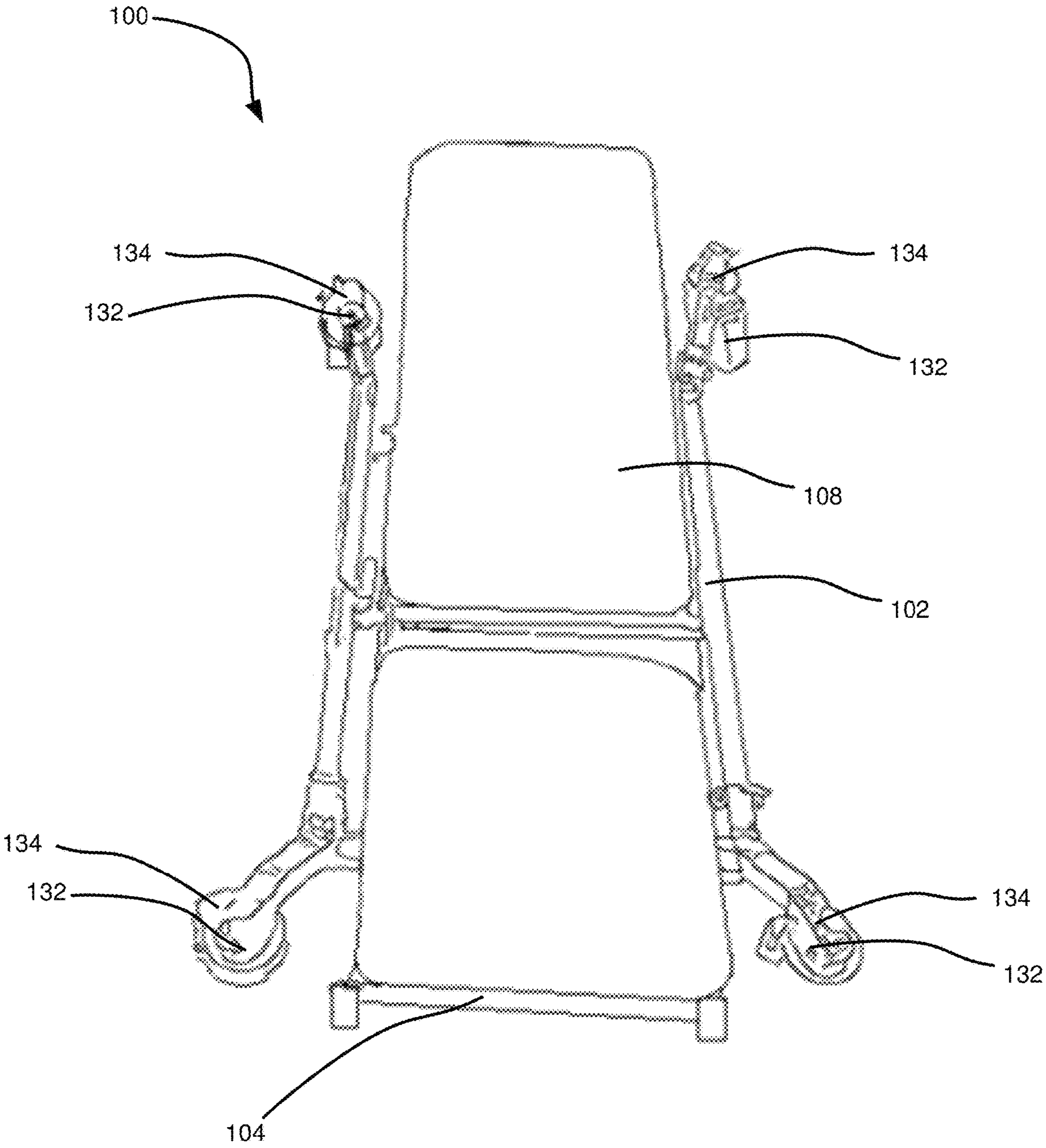
FIG. 5 is a top view of an exemplary implementation of the adjustable creeper configured as a flat creeper.

FIG. 5 illustrates a top view of an exemplary implementation of the mechanic's creeper 100 in a collapsed flat position. In this exemplary implementation, the top frame 104 is adjacent to the bottom frame 102. The backrest 108 is not raised and is adjacent to the top frame 104. The exemplary implementation of FIG. 5 also shows a plurality of rolling members, which in this exemplary implementation are casters 132. However, it will be appreciated that any type of rolling members may be used. Casters 132 or whichever rolling members utilized may additionally feature brakes 134.

It should be appreciated that in this exemplary implementation, at least two of the casters 132 are disposed on the bottom frame 102 at an angle of at least about thirty degrees to about forty-five degrees outward from a longitudinal axis of the bottom frame rails 116. The positioning of the casters 132 in this way creates a wider stance and greater stability when the top frame 104 and/or the backrest 108 are raised and provides required clearance in the horizontal position. This allows a mechanic or technician to reach farther and move more without having to worry about the mechanic's creeper 100 becoming unstable and/or tipping over.

Figure 6:
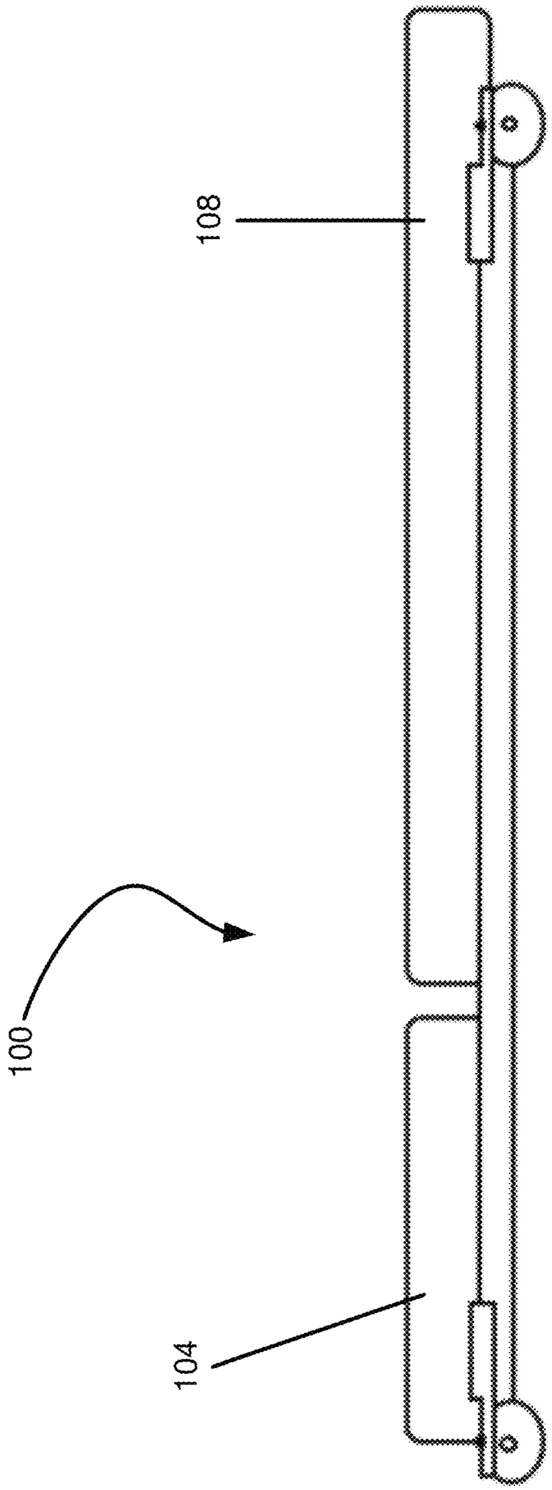
FIG. 6 is a side view of an exemplary implementation of the adjustable creeper configured as a flat creeper in the collapsed position.

This exemplary implementation is further illustrated in FIG. 6, which shows a side view of the mechanic's creeper 100 in a fully collapsed position. It should be appreciated that in the collapsed position, the mechanic's creeper 100 is a simple and easy to use creeper that will allow a worker easy access and mobility while working under aircraft, automobiles, or other machines.

Furthermore, the mechanic's creeper 100 is very easy to adjust. Height adjustments are made simply by lifting the top frame 104 to a desired height, while the backrest 108 is independently adjusted by simply actuating, manipulating, or rotating the one or more levers 121 to move the spring guided frame 123 and the linkage 125 pushes the connecting bar 130 forward and out of the grooves 124 of the second ratcheting locking device 128 to a desired position, height, and/or angle. The mechanic's creeper 100 has eighty different configurations, but it can be adjusted from a fully collapsed configuration to any suitable configuration and back to the fully collapsed configuration in just a few seconds. This adjustment ability is significant because it is not very useful for a creeper to have many different configurations if that creeper is difficult and cumbersome to transform from one configuration to a different configuration. A mechanic at work is less likely to transform the creeper if the adjustments are time consuming or difficult to execute. Thus, the inventiveness of the mechanic's creeper 100 is not only in its versatility and flexibility, but also in its utility and ease of use.

Figure 7:
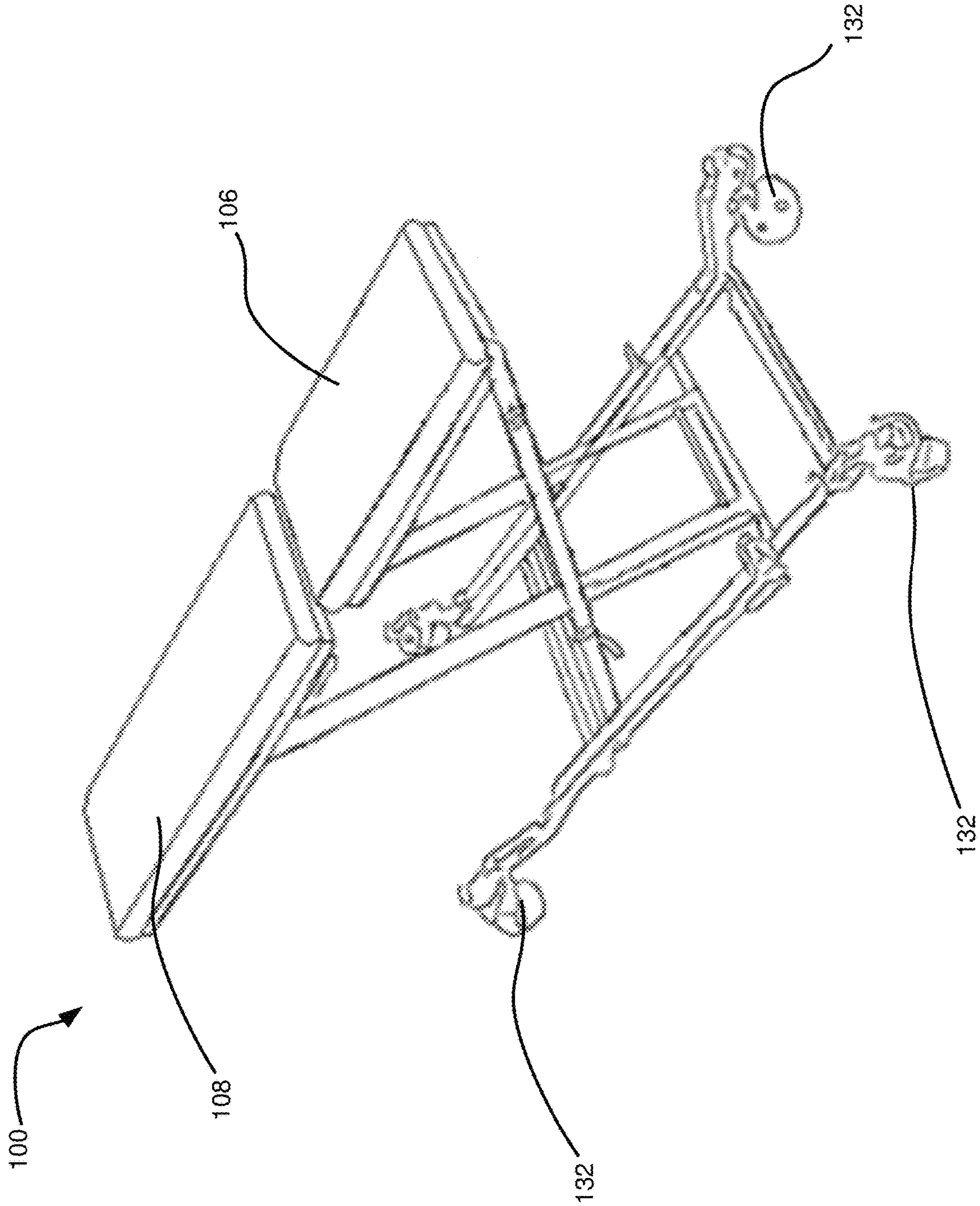
FIG. 7 is a top perspective view of an exemplary implementation of the adjustable creeper configured as a flat creeper in the expanded position.

FIG. 7 illustrates an exemplary implementation in which the mechanic's creeper 100 is in a raised, flat position. It should be appreciated that in the raised position, the creeper 100 is stable and not easily subject to tipping or falling as a worker moves and reaches in the course of their work. The casters 132 are positioned such that they are widely spaced (wider than the width of the seat 106 and the backrest 108). The wide spacing of the casters 132 relative to the width of the seat 106 and the backrest 108 provides for maximum stability when the top frame 104 is in the raised position, while also allowing for easy movement of the creeper 100 for a worker needing to reposition themselves in the course of their work.

Figure 8:
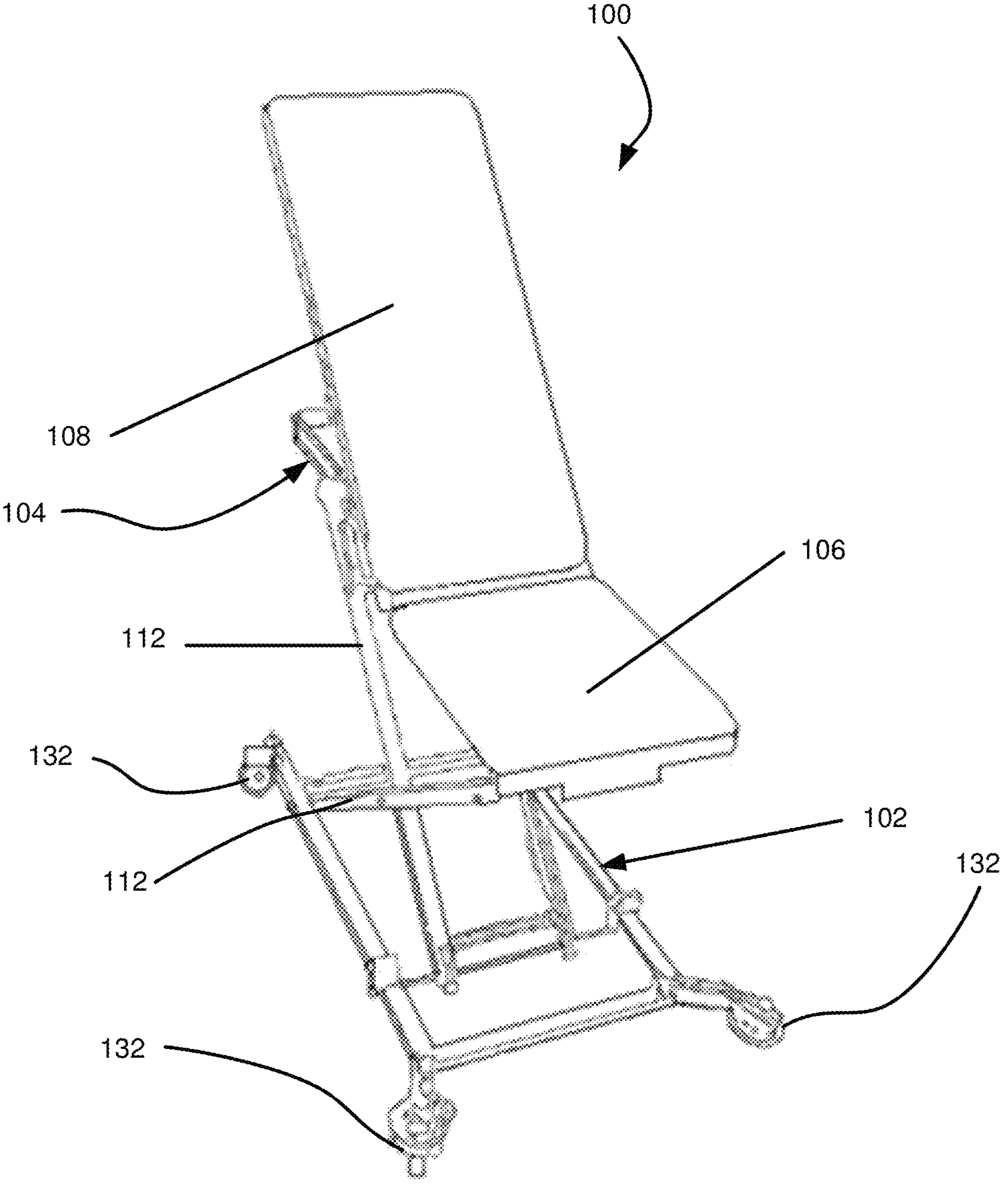
FIG. 8 is a top perspective view of an exemplary implementation of the adjustable creeper configured in the chair position.

FIG. 8 shows an exemplary implementation in which the mechanic's creeper 100 is raised and configured as a chair in a reclined position. In the exemplary implementation of FIG. 8, the backrest 108 is raised about halfway, while the top frame 104 is fully raised. Again, it is worth noting that the location of the casters 132 provides stability and a wide base to prevent tipping while a mechanic or technician is working. Furthermore, mechanic's creeper can be adjusted from this position, to a fully collapsed flat position in about a second or two.

It should be appreciated that the exemplary implementation of the mechanic's creeper 100 is small enough and simple enough that it can be conveniently stored and transported to any location where it is needed. Furthermore, the exemplary implementation of the mechanic's creeper 100 has eighty different configurations thereby providing maximum flexibility for a worker to find a comfortable position as work is done. Finally, adjustments to the mechanic's creeper 100 are simple and easy, taking only a few seconds.

EXAMPLES

The following examples pertain to further embodiments of the disclosure.

Reference throughout this specification to "an example" means that a particular feature, structure, or characteristic described in connection with the example is included in at least one embodiment of the disclosure. Thus, appearances of the phrase "in an example" in various places throughout this specification are not necessarily all referring to the same embodiment.

Example 1 is a mechanic's creeper comprising: a bottom frame; a top frame; a plurality of rolling members disposed proximate the bottom frame; a seat disposed proximate the top frame, and a backrest disposed proximate the top frame; wherein the top frame is height adjustable; and wherein the angle of the backrest is independently adjustable relative to the seat.

Example 2 is a mechanic's creeper as in Example 1, wherein the bottom frame is wider than the top frame.

Example 3 is a mechanic's creeper as in any of examples 1-2, wherein at least two of the plurality of rolling members are disposed proximate the bottom frame at an angle of at least about thirty degrees to about forty-five degrees outward from a longitudinal axis of a rail of the bottom frame.

Example 4 is a mechanic's creeper as in any of Examples 1-3, wherein the mechanic's creeper further comprises an adjustment mechanism.

Example 5 is a mechanic's creeper as in any of examples 1-4, wherein the adjustment mechanism comprises a first ratcheting mechanism.

Example 6 is a mechanic's creeper as in any of examples 1-5, wherein the first ratcheting mechanism comprises at least ten ratchet settings.

Example 7 is a mechanic's creeper as in any of examples 1-6, wherein the backrest comprises a second ratcheting mechanism.

Example 8 is a mechanic's creeper as in any of examples 1-7, wherein the second ratcheting mechanism comprises at least eight ratchet settings.

Example 9 is a mechanic's creeper as in any of Examples 1-8, wherein the mechanic's creeper further comprises at least two ratcheting mechanisms.

Example 10 is a mechanic's creeper as in any of Examples 1-9, wherein each of the first and second ratcheting mechanisms include at least five ratchet settings.

Example 11 is a mechanic's creeper as in any of Examples 1-10, wherein each of the first and second ratcheting mechanisms include at least eight ratchet settings.

Example 12 is a mechanic's creeper as in any of Examples 1-11, wherein the mechanic's creeper takes less than five seconds to configure to a new height and/or backrest configuration.

Example 13 is a mechanic's creeper as in any of Examples 1-12, wherein the mechanic's creeper takes about two-three seconds to configure to a new height and/or backrest configuration.

Example 14 is a mechanic's creeper comprising: a bottom frame; a plurality of rolling members disposed proximate the bottom frame; a top frame; a seat disposed proximate the top frame; a backrest disposed proximate the top frame; and an disposed between the bottom frame and the top frame; wherein the adjustment mechanism is configured to raise the top frame; wherein the top frame further comprises a first ratcheting mechanism configured to lock the adjustment mechanism at a chosen height; and wherein the backrest further comprises a second ratcheting mechanism that operates independent of the first ratcheting mechanism and is configured to lock the backrest at a chosen angle.

Example 15 is a mechanic's creeper as in Example 14, wherein the top frame may be adjustable to ten or more discrete settings.

Example 16 is a mechanic's creeper as in any of Examples 14-15, wherein the backrest may be adjustable to eight or more discrete settings.

Example 17 is a mechanic's creeper as in any of Examples 14-16, wherein the mechanic's creeper may be configured in 20 or more different ways.

Example 18 is a mechanic's creeper as in any of Examples 14-17, wherein the mechanic's creeper may be configured in 50 or more different ways.

Example 19 is a mechanic's creeper as in any of Examples 14-18, wherein the mechanic's creeper may be configured in 80 or more different ways.

Example 20 is a mechanic's creeper as in any of Examples 14-19 wherein the top frame and the backrest are padded.

Example 21 is a mechanic's creeper as in any of Examples 14-20, wherein the plurality of rolling members includes four or more rolling members.

Example 22 is a mechanic's creeper as in any of Examples 14-21, wherein the plurality of rolling members comprises casters.

Example 23 is a mechanic's creeper as in any of Examples 14-22, wherein the plurality of rolling members include a brake.

Example 24 is a mechanic's creeper as in any of examples 14-23, wherein the top frame, bottom frame, and adjustment mechanism comprise a metal.

Example 25 is a system for an adjustable seat, an adjustable backrest, and a rolling means for a mechanical creeper. The system includes a mechanic's creeper that comprises a bottom frame; a plurality of rolling members disposed proximate the bottom frame; a top frame; a seat disposed proximate the top frame; a backrest disposed proximate the top frame; and an adjustment mechanism disposed between the bottom frame and the top frame; wherein the adjustment mechanism is configured to raise the top frame; wherein the top frame further comprises a first ratcheting mechanism configured to lock the adjustment mechanism at a chosen height; and wherein the backrest further comprises a second ratcheting mechanism configured to lock the backrest at a chosen angle. The mechanic's creeper includes any of the features described in connection with the mechanic's creepers of Examples 1-24.

Example 26 is a creeper device that includes a bottom frame and a top frame attached to the bottom frame; wherein the top frame includes a first ratcheting locking device; a backrest is disposed proximate and attached to the top frame; a seat is disposed proximate and attached to the top frame; wherein the first ratcheting locking device provides height adjustment of the top frame such that a height position of the seat is adjustable; and an angle of the backrest is independently adjustable relative to the height position of the seat.

Example 27 is a creeper device as in example 26, wherein the bottom frame comprises a first frame rail and a second frame rail and one or more bottom frame cross members that connects the first frame rail and the second frame rail; and wherein the bottom frame is wider than the top frame.

Example 28 is a creeper device as in any of examples 26-27, wherein the device further comprises a plurality of rolling members disposed proximate to the bottom frame; wherein at least two of the plurality of rolling members are disposed proximate the bottom frame at an angle of at least about thirty degrees to about forty-five degrees outward from a longitudinal axis of a rail of the bottom frame.

Example 29 is a creeper device as in any of examples 26-28, wherein the device further comprises an adjustment mechanism that comprises a first set of crisscross supports and a second set of crisscross supports that allow the top frame to move relative to the bottom frame thereby raising and lowering the top frame relative to the bottom frame.

Example 30 is a creeper device as in any of examples 26-29, wherein the first ratcheting locking device comprises a plurality of ratchet lock positions.

Example 31 is a creeper device as in any of examples 26-30, wherein the first ratcheting locking device comprises at least ten ratchet settings.

Example 32 is a creeper device as in any of examples 26-31, wherein the backrest comprises a second ratcheting locking device, wherein the second ratcheting locking device comprises a plurality of ratchet lock positions.

Example 33 is a creeper device as in any of examples 26-32, wherein the second ratcheting locking device comprises at least eight ratchet settings.

Example 34 is a creeper device as in any of examples 26-33, wherein the device further comprises at least two independent ratchet locking devices comprising the first ratcheting locking device and a second ratcheting locking device.

Example 35 is a creeper device as in any of examples 26-34, wherein each of the first ratcheting locking device and the second ratcheting locking device include at least five ratchet settings.

Example 36 is a creeper device as in any of examples 26-35, wherein each of the first ratcheting locking device and the second ratcheting locking device include at least eight ratchet settings.

Example 37 is a creeper device as in any of examples 26-36, wherein the backrest comprises the second ratcheting locking device, wherein the second ratcheting locking device comprises one or more levers attached to a spring guided frame and a linkage with a first connecting bar running through a part of the linkage.

Example 38 is a creeper device as in any of examples 26-37, wherein the linkage comprises a second connecting bar that connects to one or more the levers, such that rotational movement of the levers results in rotational movement of the second connecting bar.

Example 39 is a creeper device as in any of examples 26-38, wherein the linkage comprises two support members that are connected by the first connecting bar, wherein the two support members are attached and secured to the spring guided frame and the top frame.

Example 40 is a creeper device as in any of examples 26-39, wherein the backrest is adjusted by linkage by actuating at least one or more of the levers, such that the spring guided frame and the linkage pushes the first connecting bar forward and out of the second ratcheting locking device to a desired position, height, or angle.

Example 41 is a creeper device that includes a top frame; a bottom frame; an adjustable seat attached to the top frame; an adjustable backrest attached to the top frame; and an adjustment mechanism disposed between the bottom frame and the top frame; wherein the adjustment mechanism is configured to raise and lower the top frame; wherein the top frame comprises a first ratcheting locking device configured to lock the adjustment mechanism at a chosen height; and wherein the backrest comprises a second ratcheting locking device that is independent from the first ratcheting locking device and configured to lock the backrest at a chosen angle.

Example 42 is a creeper device as in example 41, wherein the top frame may be adjustable to ten or more discrete settings.

Example 43 is a creeper device as in any of examples 41-42, wherein the backrest may be adjustable to eight or more discrete settings.

Example 44 is a creeper device as in any of examples 41-43, wherein the mechanic's creeper may be configured in 20 or more different ways.

Example 45 is a creeper device as in any of examples 41-44, wherein the device further comprises a plurality of rolling members attached to the bottom frame, wherein the plurality of rolling members include a brake.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the disclosure may be referred to herein along with alternatives for the various components thereof. It is understood that such embodiments, examples, and alternatives are not to be construed as de facto equivalents of one another but are to be considered as separate and autonomous representations of the disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure.

What is claimed is:

1. A creeper device comprising:

at least two independent ratchet locking devices comprising a first ratcheting locking device and a second ratcheting locking device;

a bottom frame;

a top frame attached to the bottom frame and comprising the first ratcheting locking device;

a backrest attached to the top frame, wherein the backrest comprises the second ratcheting locking device; and a seat attached to the top frame;

wherein the first ratcheting locking device provides height adjustment of the top frame such that a height position of the seat is adjustable;

wherein the second ratcheting locking device comprises:

one or more levers attached to a spring guided frame, a linkage, and a first connecting bar that runs through the linkage; and wherein an angle of the backrest is independently adjustable relative to the height position of the seat.

2. The creeper device of claim 1, wherein the bottom frame comprises a first frame rail and a second frame rail and one or more bottom frame cross members that connects the first frame rail and the second frame rail; and wherein the bottom frame is wider than the top frame.

3. The creeper device of claim 1, wherein the creeper device further comprises a plurality of rolling members attached to the bottom frame; wherein at least two of the plurality of rolling members are attached to the bottom frame at an angle between thirty degrees to forty-five degrees outward from a longitudinal axis of a rail of the bottom frame.

4. The creeper device of claim 1, wherein the creeper device further comprises an adjustment mechanism that comprises a first set of crisscross supports and a second set of crisscross supports that allow the top frame to move relative to the bottom frame thereby raising and lowering the top frame relative to the bottom frame.

5. The creeper device of claim 1, wherein the first ratcheting locking device comprises a plurality of ratchet lock positions.

6. The creeper device of claim 5, wherein the first ratcheting locking device comprises at least ten ratchet settings.

7. The creeper device of claim 1, wherein the backrest comprises the second ratcheting locking device, wherein the second ratcheting locking device comprises a plurality of ratchet lock positions.

8. The creeper device of claim 7, wherein the second ratcheting locking device comprises at least eight ratchet settings.

9. The creeper device of claim 1, wherein each of the first ratcheting locking device and the second ratcheting locking device include at least five ratchet settings.

10. The creeper device of claim 1, wherein each of the first ratcheting locking device and the second ratcheting locking device include at least eight ratchet settings.

11. The creeper device of claim 1, wherein the linkage comprises a second connecting bar that connects to one or more of the levers, such that rotational movement of the levers results in rotational movement of the second connecting bar.

12. The creeper device of claim 11, wherein the linkage comprises two support members that are connected by the first connecting bar, wherein the two support members are attached and secured to the spring guided frame and the top frame.

13. The creeper device of claim 12, wherein the backrest is adjusted by the linkage by actuating at least one or more of the levers, such that the spring guided frame and the linkage pushes the first connecting bar forward and out of the second ratcheting locking device to a desired position, height, or angle.

14. A creeper device comprising:

a top frame;

a bottom frame, wherein the bottom frame is attached to the top frame;

an adjustable seat attached to the top frame;

an adjustable backrest attached to the top frame; and an adjustment mechanism disposed between the bottom frame and the top frame, wherein the adjustment mechanism is configured to raise and lower the top frame;

wherein the top frame comprises a first ratcheting locking device configured to lock the adjustment mechanism at a chosen height; and wherein the backrest comprises a second ratcheting locking device that is independent from the first ratcheting locking device and configured to lock the backrest at a chosen angle;

wherein the second ratcheting locking device comprises: one or more levers attached to a spring guided frame, a linkage, and a connecting bar that runs through the linkage.

15. The creeper device of claim 14, wherein the top frame is adjustable to ten or more discrete settings.

16. The creeper device of claim 14, wherein the backrest is adjustable to eight or more discrete settings.

17. The creeper device of claim 14, wherein the first ratcheting locking device of the creeper device and the second ratcheting locking device of the creeper device are independently adjustable such that both the first ratcheting locking device and the second ratcheting locking device together comprise 20 or more discrete settings.

18. The creeper device of claim 14, wherein the creeper device further comprises a plurality of rolling members attached to the bottom frame, wherein the plurality of rolling members includes a brake.

* * * * *